(12) United States Patent  
Kirkpatrick

(10) Patent No.: US 7,003,329 B1
(45) Date of Patent: Feb. 21, 2006

(54) DEVICE, SYSTEM AND METHOD FOR AUGMENTING CELLULAR TELEPHONE AUDIO SIGNALS

(75) Inventor: Mark Kirkpatrick, Conyers, GA (US)

(73) Assignee: BellSouth Intellectual Property Corp., Wilmington, DE (US)

(*) Notice: Subject to any disclaimer, the term of this patent is extended or adjusted under 35 U.S.C. 154(b) by 524 days.

(21) Appl. No.: 10/101,724

(22) Filed: Mar. 21, 2002

Related U.S. Application Data

(63) Continuation-in-part of application No. 09/964,389, filed on Sep. 28, 2001.

(51) Int. Cl.
H04M 1/00 (2006.01)

(52) U.S. Cl. .................. 455/567; 455/557; 455/556.1; 455/558

(58) Field of Classification Search ................ 455/567, 455/557, 556.1, 558, 550.1, 90.3, 575.1
See application file for complete search history.

(56) References Cited

U.S. PATENT DOCUMENTS

| | | | |
|---|---|---|---|
| 5,251,329 A | 10/1993 | Takagi et al. | |
| 5,452,354 A | 9/1995 | Kyronlahti et al. | |
| 5,767,778 A | 6/1998 | Stone | |
| 6,094,587 A | 7/2000 | Armanto et al. | |
| 6,244,894 B1 | 6/2001 | Miyashita | |
| 6,298,245 B1 | 10/2001 | Usui et al. | |
| 6,501,967 B1 | 12/2002 | Makela et al. | |
| 6,597,279 B1 | 7/2003 | Haraguchi | |
| 6,600,098 B1 | 7/2003 | Mizuno et al. | |
| 6,810,274 B1 | 10/2004 | Sawada | |
| 2001/0014616 A1* | 8/2001 | Matsuda et al. | 455/567 |
| 2001/0016483 A1 | 8/2001 | Nakajima | |
| 2001/0041590 A1* | 11/2001 | Silberfenig et al. | 455/556 |
| 2001/0044331 A1* | 11/2001 | Miyoshi et al. | 455/572 |
| 2002/0019250 A1* | 2/2002 | Le-Faucher et al. | 455/567 |
| 2002/0111189 A1* | 8/2002 | Chou | 455/557 |
| 2002/0160751 A1* | 10/2002 | Sun et al. | 455/412 |
| 2002/0186122 A1 | 12/2002 | Gehlot | |
| 2003/0008646 A1* | 1/2003 | Shanahan | 455/418 |
| 2003/0032415 A1* | 2/2003 | Cho et al. | 455/415 |
| 2003/0176206 A1* | 9/2003 | Taniguchi et al. | 455/567 |

OTHER PUBLICATIONS

U.S. Appl. No. 09/964,385, Kirkpatrick.
U.S. Appl. No. 10/101,630, Kirkpatrick.

* cited by examiner

Primary Examiner—Sonny Trinh
Assistant Examiner—Huy Phan
(74) Attorney, Agent, or Firm—Withers & Keys, LLC

(57) ABSTRACT

A device, system and method is described for augmenting cellular telephone signals for a cellular telephone. In an exemplary embodiment, an audio signal device cellular is provided with a sound generating device that stores one or more audio signals that are activated upon receipt of a telephone call. Optionally, the audio signal device may store a library of audio signals that may be programmable and edited. The device, system and method of the present invention enables a user to choose audio alert sounds beyond the scope of those provided by the manufacturer of a cellular telephone. A removable memory device containing at least one accessible sound file is attachable to the audio signal device, and provides increased selection of audio signal choices.

21 Claims, 5 Drawing Sheets

DEVICE, SYSTEM AND METHOD FOR AUGMENTING CELLULAR TELEPHONE AUDIO SIGNALS

This application is a continuation-in-part of U.S. patent application Ser. No. 09/964,389 filed Sep. 28, 2001, which is incorporated by reference herein in its entirety.

BACKGROUND

1. Field of the Invention

The present invention relates generally to accessory technology used with cellular telephones. More specifically, the present invention is directed to a device, system and method for augmenting cellular telephone audio signals through a programmable accessory device.

2. Background of the Invention

Cellular telephones, also commonly known as mobile telephones, have become increasingly utilized throughout the world. Typical signals used to alert a user of a cellular telephone of an incoming telephone call include audio signals such as ringing, visual signals such as flashes or written messages, or touch signals such as vibration of the telephone. A combination of signals also is possible, such as, for example, a combination of audio and visual signals.

When a cellular telephone provides audio signals, the user typically has a limited number of pre-selected audio signal selections (which may include standard rings, musical tones, or melodies) already programmed into the telephone. Many conventional telephones do not have the ability to introduce additional audio alert signals. Thus, the user is confined to a limited group of audio alert signals that a manufacturer has pre-programmed into the telephone. Although some telephone systems allow a user to download additional audio alert signals into the telephone, such additional signals typically are provided only by the manufacturer, and are merely an expansion of the original limited inventory of audio signals available to a user. Thus, the user is still confined to a set of audio signals that a manufacturer provides to its users. The user does not have the ability to use audio signals of her own choice, such as, for example, a favorite song or melody, sounds of nature, or voice sounds of a child or a pet or the user herself.

Thus, there is a need for an economical but flexible accessory device, system, and method that enables a user to easily choose any type of audio sounds to be used by a cellular telephone and allow such audio sounds to be designated as the incoming telephone call audio alert signal.

SUMMARY OF THE INVENTION

The present invention overcomes the drawbacks of conventional cellular telephone audio alert signals by providing a device, system and method that enables the user to enter audio signals of his or her own choice to use as audio alert signals for the telephone.

As used throughout this disclosure, the term "augmenting", when used in reference with cellular telephone audio signals, refers to an increase in choices that a user has for audio alert signals. Thus, an increase in choices of alert signals beyond that provided by a manufacturer is an augmenting of cellular telephone audio signals.

As used throughout this disclosure, the term "sound generating device" is any assembly that is capable of storing sound files, retrieving sound files, and playing sound files. Thus, such a device typically is piezoelectric and contains software to enable a stored sound file to be played, necessary EPROM, ROM and/or RAM memories, and a small speaker. Such sound generating devices typically are used in toys and musical cards.

In accordance with an exemplary embodiment, the present invention provides an audio signal device that plays sounds and is used with a cellular telephone. The audio signal device has electrical terminals, located on a shell, that are connectable with electric terminals on a cellular telephone. The audio signal device optionally also has electric terminals that are connectable with electric terminals on a cellular telephone battery. The audio signal device also has a sound generating device capable of storing a sound file. The sound generating device is triggered to play sound when an incoming telephone call is received. Thus, the audio signal device is attachable to an existing cellular telephone body without need for modification to the telephone body or the cellular telephone battery. Optionally, the sound generating device can store multiple sound files, and a selector switch on the shell that allows a user to select a designated sound file from the multiple sound files. Furthermore, an optional external connector socket allows a user to edit, add or delete sound files stored in the sound generating device.

In accordance with another exemplary embodiment, the present invention provides a cellular telephone system that includes a cellular telephone body, a cellular telephone battery, and an audio signal device as described above.

In accordance with yet another exemplary embodiment, the present invention provides a method of programming designated audio alert signals on a cellular telephone by adding or deleting sound files to the audio signal device as described above.

In accordance with another exemplary embodiment, the present invention provides a method of selecting a designated audio alert signal on a cellular telephone using the selector switch as described above to scroll through a selection of audio files on the audio signal device, hearing the selections, and choosing one to be the designated alert signal for incoming telephone calls.

In accordance with an exemplary embodiment, the present invention includes a device, system and method for selectively programming a telephone with any type of sound signal to be used as an audio alert signal for incoming calls.

In another exemplary embodiment of the present invention, the present invention includes a device, system and method that is compatible with different types of cellular telephone systems.

In accordance with another exemplary embodiment, the present invention includes a removable memory device that stores at least one sound file and is receivable by a memory device receiving slot on the audio signal device.

It is therefore an object of the present invention to provide a device, system, and method of augmenting cellular telephone audio alert signals that do not require changing the design of the telephone body itself.

It is yet another object of the present invention to provide a device for augmenting cellular telephone audio alert signals that is designed to fit between the telephone body and the battery.

These and other objects of the present invention will become apparent upon a reading of the following detailed description in conjunction with the associated drawings.

It is to be understood that both the foregoing general description and the following detailed description are exemplary and explanatory only and are not restrictive of the invention, as claimed.

The advantages and purpose of the invention will be set forth in part in the description that follows, and in part will be obvious from the description, or may be learned by practice of the invention. The advantages and purpose of the invention will be realized and attained by means of the elements and combinations particularly pointed out in the appended claims.

DETAILED DESCRIPTION OF THE INVENTION

Figure 1:
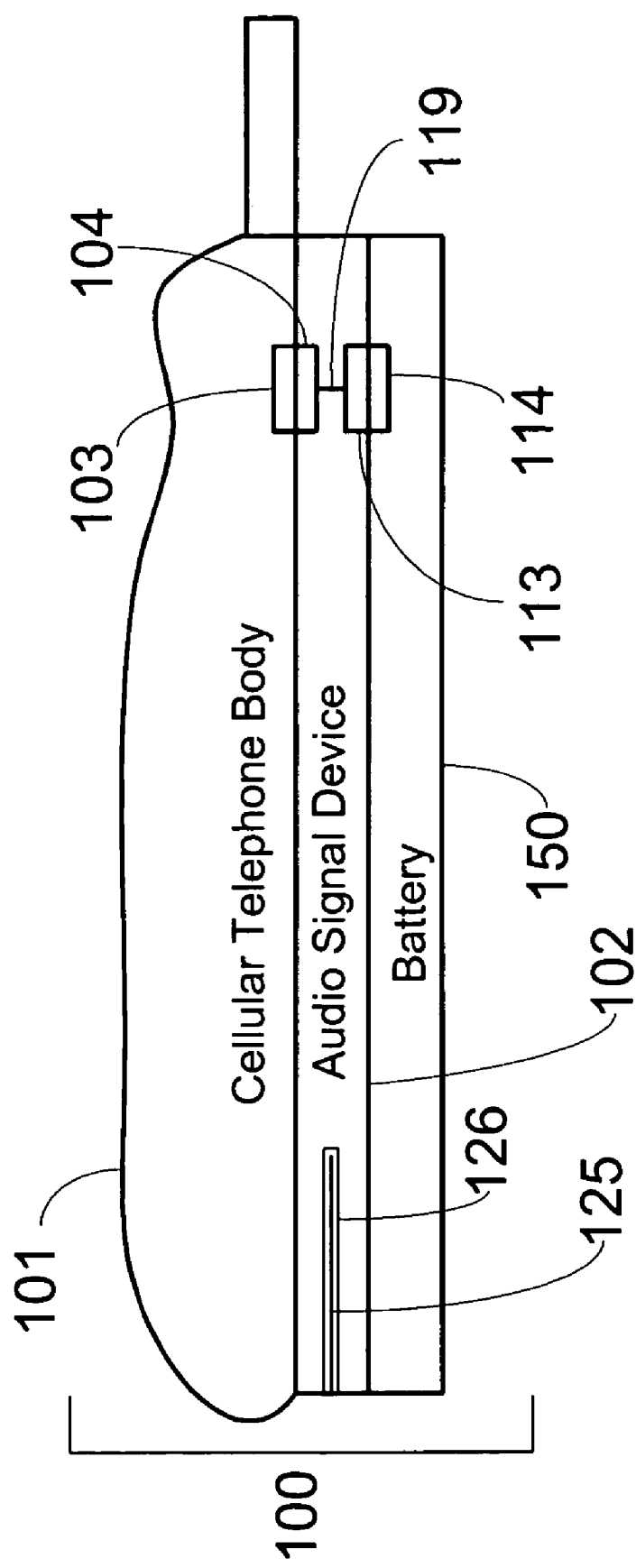
FIG. 1 illustrated an exemplary embodiment of the present invention in position between a cellular telephone body and a cellular telephone battery.

An exemplary embodiment of a device according to the present invention is shown schematically in FIG. 1. A cellular telephone system 100 using the exemplary embodiment of the audio signal device 102 is shown. A cellular telephone 101 is positioned to one side of the audio signal device 102 and a conventional cellular telephone battery 150 is positioned on the opposite side of audio signal device 102. Electrical connectors 103, 104, 113, and 114 connect the three components of the system 100 together. Electrical connectors 103 on the cellular telephone body 101 electrically communicate with electrical connectors 104 on the audio signal device 102. Electrical connectors 113 on the audio signal device electrically communicate with electrical connectors 114 on the battery 150.

Suitable physical connection means (not shown) are used to reversibly lock the cellular telephone body 101 to the audio signal device 102, and the audio signal device 102 to the battery 150. Such connection means include those that are commonly used to reversibly lock a cellular telephone body 101 to a standard cellular battery 150.

Furthermore, in the embodiment shown in this FIG. 1, device 102 is sandwiched between the cellular telephone body 101 and the battery 150. However, the audio signal device 102 also may be positioned elsewhere, such as, for example, on the outside end of a battery 150 such that the battery is sandwiched between the cellular telephone body 101 and the audio signal device 102. In such an embodiment, the battery 102 must be designed to be able to electrically and physically connect to both the cellular telephone body 101 and the audio signal device 102.

As further shown in FIG. 1, a removable memory device 125 storing at least one sound file is electrically connected to a memory device receiving slot 126. The interaction and functions of the memory device 125 and the receiving slot 126 will be described in detail below with respect to FIG. 3.

Figure 2:
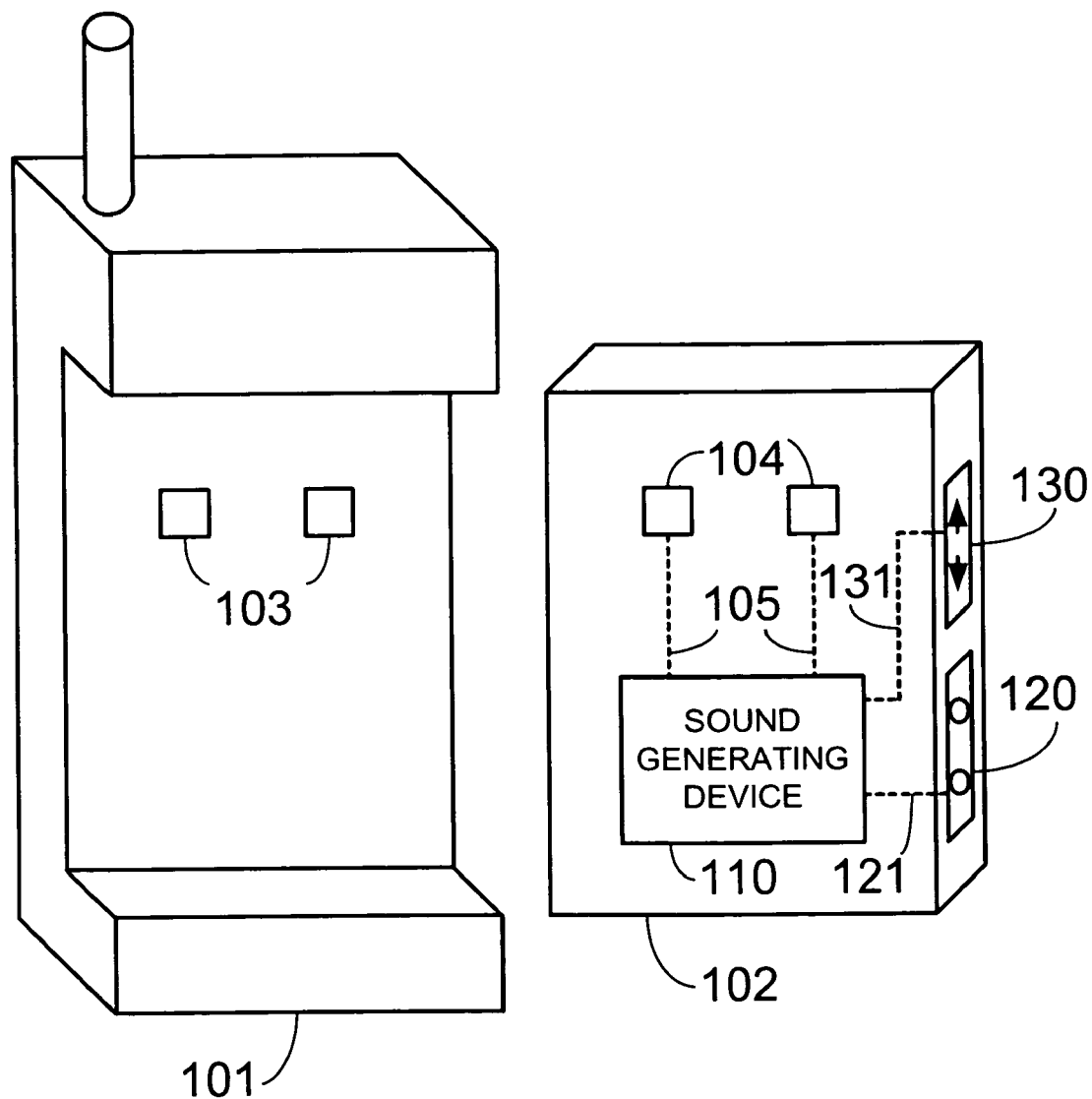
FIG. 2 illustrates a conventional cellular telephone body with a device, according to an exemplary embodiment of the present invention, that allows for a variety of audio alert signals to be used.

FIG. 2 illustrates a standard telephone body 101 in relation to a device 102 according to an exemplary embodiment of the present invention. The device 102 is in the form of a substantially rectangular planar shell that produces sound, thereby making such a device, system and method of augmenting telephone audio signals both economical and flexible.

The exemplary embodiment of the present invention shown in FIGS. 2–5 presents an improvement based on the technology of vibrating batteries, wherein an activation signal is directed to the vibrating battery to vibrate the telephone when an incoming call is received. Thus, the audio signal device 102 according to the embodiment shown in FIGS. 2–5 also depends upon an incoming signal from the body of the telephone 101 to alert the battery 150 of an incoming call. The telephone body 101 does not have to be modified to accommodate the new audio signal device 102. Furthermore, the battery 150 does not need to be modified to attach to the audio signal device 102.

Thus, the telephone body 101 is merely set up as if the battery 150 is a vibrating battery, thereby enabling the telephone body 101 to send a signal to the battery 150 through the audio signal device 102 when an incoming telephone call is received. Such a signal is needed by the battery 150 in order to activate a recorded sound signal in the audio signal device 102.

The telephone body 101 is in electrical communication with the audio signal device 102 through suitable terminal connectors 103 and 104, respectively. Thus, when an incoming telephone call signal is detected by the cellular telephone system 100, the telephone body 101 sends a signal to the battery 150 through the audio signal device 102. When the audio signal device 102 is connected to a conventional vibration battery 150, the audio sound generating device 110 in the audio signal device 102 is signaled to activate, producing a given audio alert signal. In all aspects, the telephone body 101 is conventional and only needs to be able to notify the audio signal device 102 that an incoming telephone signal has been received. Furthermore, the designated audio alert signal also may be used for other notification alarms that are available on the cellular telephone, such as appointment alarms and the like.

Sound generating device 110 may comprise, for example, a piezoelectric device for converting electronic signals to sound waves. Alternatively, it may also comprise a miniature speaker or other transducer for converting electronic signals to sound waves. The sound generating device also has a memory in which the sound files can be stored. A sound chip that has all the components necessary to store, access, play, and generate sound from sound files may be used.

The audio signal device 102 has terminal connectors 104 that communicate with a sound generating device 110 through suitable electrical connectors 105. Furthermore, battery 150 provides power via terminal connectors 114 on battery 150 to terminal connectors 113 on audio signal device 102, to terminal connectors 104 via connector 119, and to terminal connectors 103 on the telephone body 101. The power storage area of the battery 150 is not shown in the Figures for sake of clarity. However, the power storage area of the battery 150 also is in communication with the terminal connectors 114 through suitable electrical connectors.

Sound generating device 110 may be pre-programmed with a set of audio signals that a user may use as the audio alert signal when an incoming telephone call is received. Thus, a user may purchase an audio signal device 102 that has a list of audio alert signals pre-programmed into it. As a non-limiting example, different audio signal devices 102 may have different themes, such as "sounds of nature", "popular songs", and "different automobile honks". When a user prefers another set of audio alert signals, she merely has to purchase another battery that provides such signals.

Optionally, an audio signal device 102 provides a user with a list of accessible audio alert signals. In that case, the user needs a means to select a particular desired audio signal. Such a selector means to select a desired audio alert signal may be, for example, a selector switch, button, mechanical selector, touch pad, or the like. In the embodiment shown in FIGS. 2–4, a selector switch 130 is shown that enables a user to select a desired audio alert signal by pressing up or down selector arrows that allow the user to scroll through an internal library of signals stored in audio signal device 102. Switch 130 shown in the exemplary embodiment functions by applying a gentle pressure on the up or down arrow to scroll the selection of internal audio signals in one direction or the other. Optionally, the user can hear the selections as the selections are being scrolled so as to have an indication of which signal the audio signal device 102 is being locked into using as the pre-selected audio alert signal. Alternatively, the selector switch 130 provides the user additional options, such as sequential and random audio alert signal selection. When sequential signal selection is chosen, each successive telephone call received will use the next sequential audio alert signal in memory. When random signal selection is chosen, each successive telephone call received will use a randomly chosen audio alert signal, as chosen by the sound generating device 110.

Alternatively, to expand the selections of audio alert signals even beyond that provided by pre-packaged audio signal devices 102 having specific themes, an accessing means would be beneficial to provide a user with ability to access and edit the audio signal library of the audio signal device 102. Thus, such a means for accessing the signal library of the audio signal device 102 may be, for example, an electrical connector socket, plug, adapter, or the like. In the exemplary embodiment shown in FIG. 2, an electrical connector socket 120, which is electrically connected to the sound generating device 110 through suitable electrical connectors 121, is designed to receive a conventional two prong plug 220, such as the one shown in FIG. 5.

Although the switch 130 and the connector socket 120 are shown on a side of the audio signal device 102 for sake of accessibility and ease of operation for a user, such placement is merely exemplary. The switch 130 and socket 120 may be placed anywhere on the audio signal device 102 as long as they may be accessed by a user and are usable for their intended purposes.

Optionally, sound generating device 110 may be programmed with more than one audio signal. A means for programming the audio signal selection of an audio signal device 102 is shown in the exemplary embodiment in FIG. 5 as system 200. System 200 includes a plug 220 that electrically communicates with socket 120, and allows a computer 201 to program the sound generating device 110 (not shown in FIG. 5). In this embodiment, computer 201 is provided with software that allows a user access and edit the audio alert signal library in the sound generating device 110. The computer 201 may be a desktop model with a monitor 202 and a keyboard 203, a laptop, a personal data assistant, or any other device that has the ability to electronically access a library or stored audio files in a sound generating device 110.

Through programming system 200, the user may add or delete sound files from the sound generating device 110. The sound files may be in any suitable format, such as, for example, MP3. Preferably, the user may arrange the order of sound signals in an audio signal device 102, delete any sounds signals that are no longer desired, and/or add new sound signals in a given memory slot in sound generating device 110.

Figure 5:
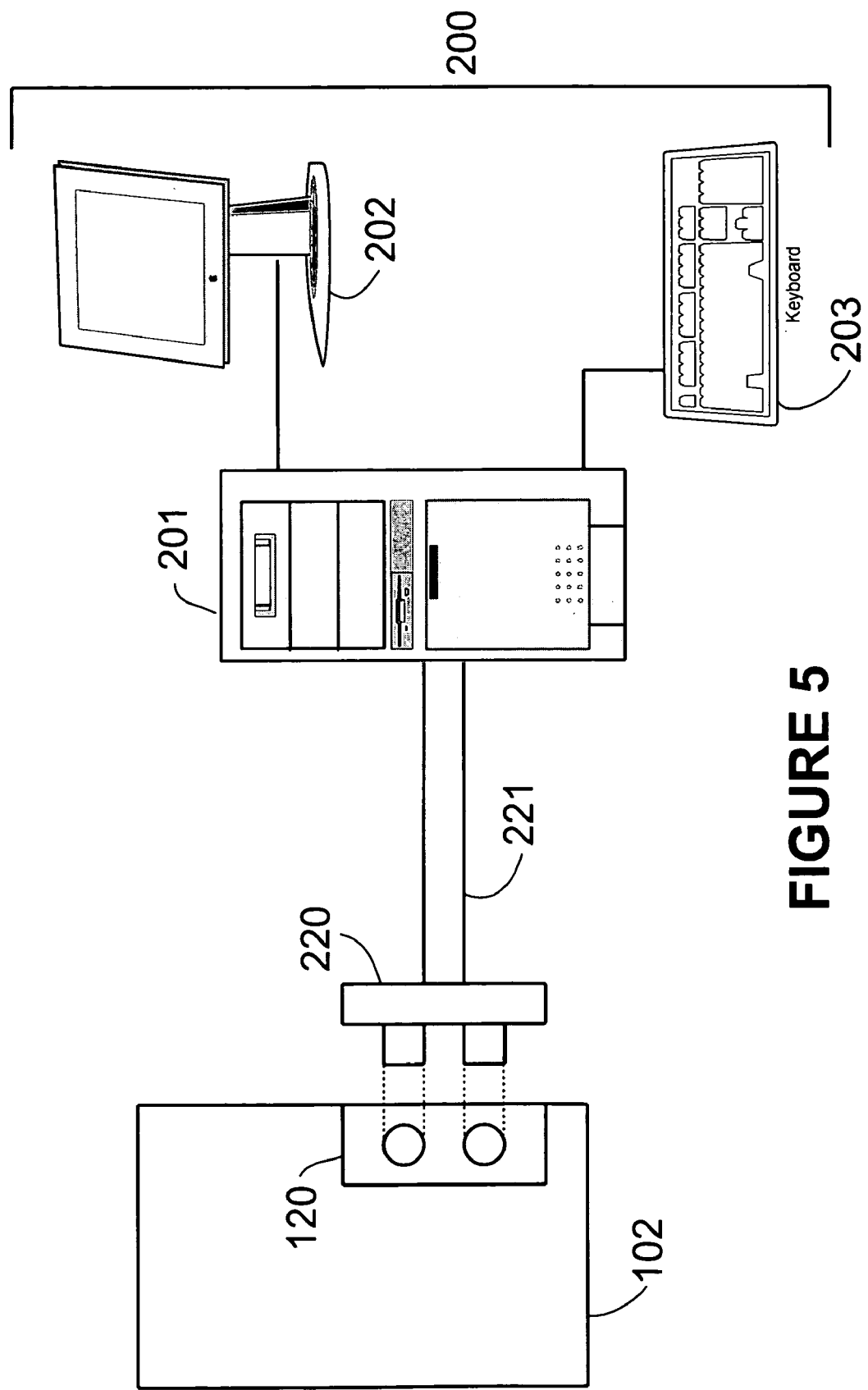
FIG. 5 illustrates an exemplary embodiment of a device, system, and method of programming audio alert signals into a device according to the exemplary embodiments shown in FIGS. 1–4.

Although the programming system 200 in FIG. 5 has been shown with a personal computer 201, other computers also are possible to program the alert signal library in the sound generating device 100. Such other computers include, but are not limited to, laptop computers, personal data assistants, suitable interactive paging systems, or the like. A telephone body 101 itself may be additionally programmed by its manufacturer to be able to scroll through, access, and edit alert signals in the signal library of a sound generating device 110 in an audio signal device 102.

Figure 3:
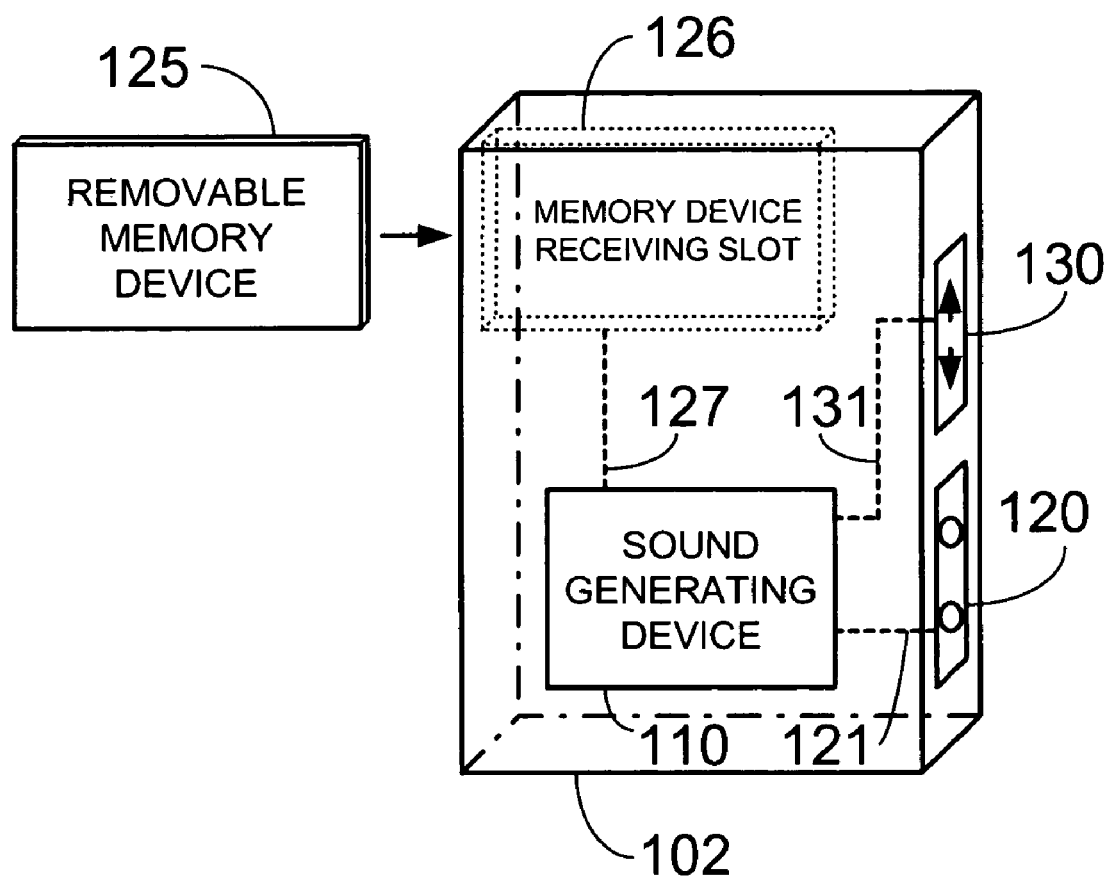
FIG. 3 illustrates a device, according to another exemplary embodiment of the present invention, that allows for changing audio alert signals through removable signal storage devices.
Figure 4:
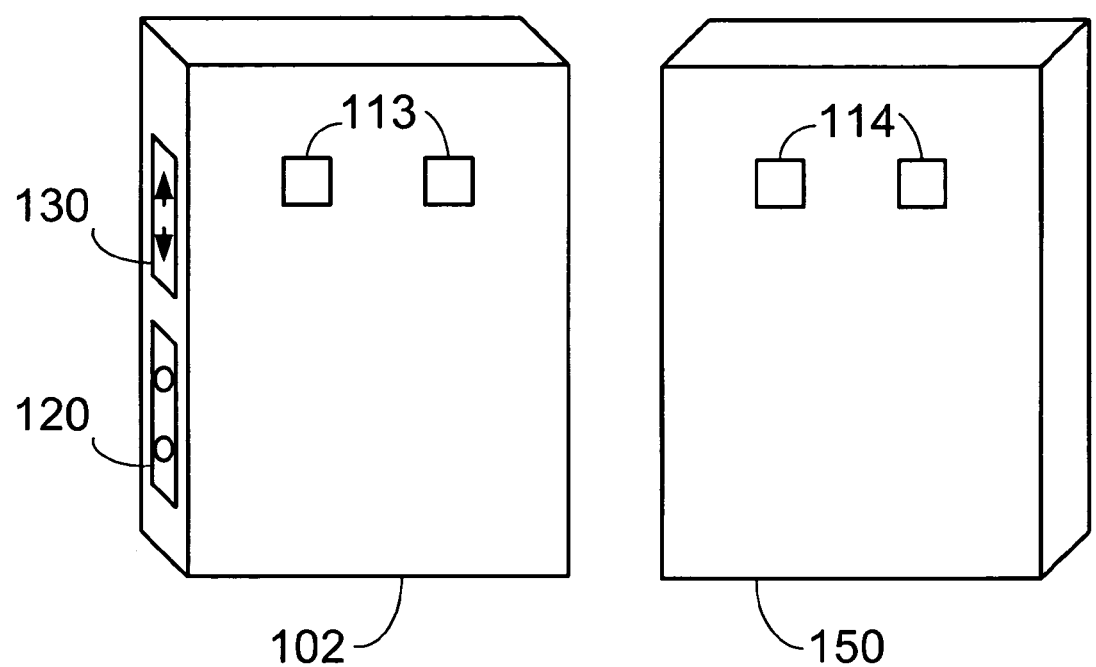
FIG. 4 illustrates an exemplary embodiment of the invention in conjunction with a cellular telephone battery.

Alternatively, sound generating device 110 may produce one or more audio signals through use of a removable memory device. Another means for programming the audio signal selection of an audio signal device 102 is shown in the exemplary embodiment in FIG. 3 as a device for storing sound files. Such a device may be a removable memory device 125, as shown in FIG. 3, which has been shown without terminal connectors 104 and electrical connectors 105 for sake of clarity. The removable memory device 125 includes one or more sound files that may be transferred to or accessed by the sound generating device 110. The removable memory device 125 is insertable into a memory device receiving slot 126 in the body of the audio signal device 102. The removable memory device 125 is shown as a memory card in FIG. 3 as an example, but other configurations for the memory device 125 are possible, as described below.

The removable memory device 125 may be any medium that is capable of storing one or more sound files and is detachable from the audio signal device 102, such as a memory stick. Alternatively, the removable memory device 125 may be attachable directly to the telephone body 101 through a similar memory receiving slot 126 located directly on the body of the telephone 101. Non-limiting examples of the removable memory device 125 include, but are not limited to, smart media cards, compact flash, memory sticks, mini-disks, digital chips, or similar memory storage devices. It would be desirable to use an industry standard technology for the removable memory device 125 to facilitate the universal transferability of stored sound files between different telephone systems 100 capable of receiving the removable memory devices 125.

The sound files may be stored in the removable memory device 125 in any format that allows for the sound files to be accessed. Non-limiting examples of the storage format of the sound files include, but are not limited to, MP3 format, wave format (.wav), MIDI format (.mid), and other similar sound file storing formats.

When the removable memory device 125 is inserted into the receiving slot 126, the sound generating device 110 gains access to the sound files stored in the removable memory device 125 through electrical or optical connection 127. When a user selects sound files through the selector switch 130, the sound generating device 110 accesses and plays the sound files in the removable memory device 125. Alternatively, the sound files stored in the removable memory device 125 may be downloaded onto the memory storage area of the sound generating device 110, from which the user may select a particular sound file through the selector switch 130.

Finally, the shape and geometry of different audio signal devices 102 would depend on the particular brand and model of cellular telephone body 101 and battery 150 that is to be connected to the device 102. Thus, consumers of such a device 102 would likely need to purchase devices 102 specifically designed for their particular brand and model of cellular telephone.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A device that plays sounds and is used with a cellular telephone, the device comprising:
   a substantially rectangular planar shell having electrical terminals on one side that are electrically connectable to electrical terminals on a cellular telephone and electrical terminals on an outer side that are electrically connectable to electrical terminals on a cellular telephone battery; and
   a sound generating device, located inside the shell and electrically connected to the electrical connectors of the planar shell that are connectable to electrical terminals on the cellular phone, comprising memory for storing a sound file downloaded from a removable memory device connectable to the shell, wherein the sound generating device is triggered to play sound associated with the sound file upon detection of a telephone call by the cellular telephone.

2. The device of claim 1, wherein the sound generating device stores a plurality of sound files, and wherein each sound file can be designated as an audio alert signal for the telephone.

3. The device of claim 2, further comprising:
   an external connector socket on the shell in electrical communication with the sound generating device to provide external access to the plurality of sound files in the sound generating device.

4. The device of claim 2, further comprising:
   a selector device on the shell for scrolling through the plurality of sound files and designating a sound file to use as an audio alert signal.

5. A device for a cellular telephone that plays sounds, the device comprising:
   a shell attachable between a cellular telephone body and a cellular telephone battery;
   a sound generating device inside the shell and comprising memory for storing a plurality of sound files downloaded from a removable memory device connectable to the shell, wherein the sound generating device is triggered to play sound associated with a sound file upon detection of a telephone call by the cellular telephone;
   an external connector socket on the shell in electrical communication with the sound generating device to provide external access to the plurality of sound files in the sound generating device; and
   a selector device on the shell for designating a sound file to use as an audio alert signal.

6. A device for a cellular telephone that plays sounds, the device comprising:
   a shell attachable between a cellular telephone body and a cellular telephone battery;
   a sound generating device inside the shell and comprising memory for storing a plurality of sound files downloaded from a removable memory device connectable to the shell, wherein the sound generating device is triggered to play sound associated with a sound file upon detection of a telephone call by the cellular telephone;
   accessing means on the shell in electrical communication with the sound generating device for providing external access to the plurality of sound files in the sound generating device; and
   selecting means on the shell for designating a sound file to use as an audio alert signal.

7. A cellular telephone system having changeable audio alert signals, the system comprising:
   a cellular telephone body;
   a cellular telephone battery for powering the cellular telephone body; and
   a first audio signal device, connectable with the cellular telephone body and the cellular telephone battery, including a first shell housing a first sound generating device comprising memory for storing a first sound file downloaded from a removable memory device connectable to the cellular telephone body, wherein the first sound generating device is triggered to play sound associated with the first sound file when connected to the cellular telephone body and the cellular telephone battery upon detection of a telephone call by the cellular telephone; and
   a second audio signal device, connectable with the cellular telephone body and the cellular telephone battery, including a second shell housing a second sound generating device comprising memory for storing a second sound file that is different than the first sound file and that is downloaded from a removable memory device connectable to the cellular telephone body, wherein the second sound generating device is triggered to play sound associated with the second sound file when connected to the cellular telephone body and the cellular telephone battery upon detection of a telephone call by the cellular telephone.

8. The system of claim 7, wherein the first and second sound generating devices each store a plurality of sound files that are capable of being edited.

9. The system of claim 8, further comprising:
   an external connector socket on each of the first and the second audio signal devices in electrical communication with the first and second sound generating devices to provide external access to the plurality of sound files in the first and the second sound generating devices.

10. The system of claim 8, further comprising:
    a computer system having an electrical plug electrically connected to the first or second sound generating device through the connector socket, for editing the first or second plurality of sound files by adding or deleting from the first or second sound generating device.

11. The system of claim 8, further comprising:
a selector device on each of the first and the second audio signal devices for scrolling through the first or second plurality of sound files and designating a sound file to use as an audio alert signal.

12. A cellular telephone system having changeable audio alert signals, the system comprising:
a cellular telephone body;
a cellular telephone battery for powering the cellular telephone body; and
an audio signal device connectable with the cellular telephone body and the cellular telephone battery and including a shell housing a sound generating device comprising memory for storing a sound file downloaded from a removable memory device connectable to the cellular telephone body, wherein the sound generating device stores a plurality of sound files and is triggered to play a sound associated with a designated sound file upon detection of a telephone call by the cellular telephone.

13. The system of claim 12, further comprising:
an external connector socket on the audio signal device in electrical communication with the sound generating device to provide external access to the plurality of sound files in the sound generating device.

14. The system of claim 12, further comprising:
a computer system having an electrical plug electrically connected to the sound generating device through the connector socket, for editing the plurality of sound files by adding or deleting from the sound generating device.

15. The system of claim 12, further comprising:
a selector device on the audio signal device for scrolling through the plurality of sound files and designating a sound file to use as an audio alert signal.

16. A cellular telephone system having changeable audio alert signals, the system comprising:
a cellular telephone body;
a cellular telephone battery for powering the cellular telephone body;
an audio signal device, connectable with the cellular telephone body and the cellular telephone battery, including a shell housing a sound generating device comprising memory for storing a sound file downloaded from a removable memory device connectable to the cellular telephone body, wherein the sound generating device stores a plurality of sound files and is triggered to play a sound associated with a designated sound file upon detection of a telephone call by the cellular telephone;
an external connector socket on the audio signal device in electrical communication with the sound generating device to provide external access to the plurality of sound files in the sound generating device;
a computer system having an electrical plug electrically connected to the sound generating device through the connector socket, for editing the plurality of sound files by adding or deleting from the sound generating device; and
a selector device on the audio signal device for designating a sound file to use as an audio alert signal.

17. A cellular telephone system having changeable audio alert signals, the system comprising:
a cellular telephone body;
a cellular telephone battery for powering the cellular telephone body;
an audio signal device, connectable with the cellular telephone body and the cellular telephone battery, including a shell housing a sound generating device comprising memory for storing a sound file downloaded from a removable memory device connectable to the cellular telephone body, wherein the sound generating device stores a plurality of sound files and is triggered to play a sound associated with a designated sound file upon detection of a telephone call by the cellular telephone;
accessing means on the audio signal device and in electrical communication with the sound generating device for provide external access to the plurality of sound files in the sound generating device;
programming means, electrically connected to the sound generating device through the accessing means, for editing the plurality of sound files by adding or deleting from the sound generating device; and
selecting means on the audio signal device for designating a sound file to use as an audio alert signal.

18. A method of programming a designated audio alert signal on a cellular telephone, the method comprising:
providing an audio signal device for use with a cellular telephone and a cellular telephone battery, the audio signal device including a programmable sound generating device and a memory device receiving slot located on an outside surface;
providing a removable memory device having at least one sound file;
inserting the memory device into the memory device receiving slot;
accessing the sound file;
selecting the sound file and designating it as the audio alert signal for the telephone; and
installing the audio signal device together with the cellular telephone and the cellular telephone battery.

19. The method of claim 18, wherein the programmable sound generating device is programmed using one of a desktop computer, a laptop computer, a personal data assistant and an interactive paging system.

20. A method of selecting a designated audio alert signal on a cellular telephone, the method comprising:
providing an audio signal device within a shell for use with a cellular telephone and a cellular telephone battery, the audio signal device including a programmable sound generating device and a selector located on an outside surface, wherein the sound generating device includes a plurality of sound files downloaded from a removable memory device connectable to the battery;
scrolling through the plurality of sound files with the selector to hear the plurality of sound files;
listening to exemplary sounds;
selecting a sound file from the plurality of sound files; and
installing the audio signal device together with the cellular telephone and the cellular telephone battery.

21. The method of claim 20, wherein the selector is one of a selector switch, a button, a mechanical selector and a touch pad.

* * * * *